(12) United States Patent
Ajima et al.

(10) Patent No.: US 11,984,821 B2
(45) Date of Patent: May 14, 2024

(54) INVERTER CONTROL DEVICE

(71) Applicant: Hitachi Astemo, Ltd., Hitachinaka (JP)

(72) Inventors: Toshiyuki Ajima, Tokyo (JP); Takafumi Hara, Tokyo (JP); Akihiro Ashida, Hitachinaka (JP); Hirokazu Matsui, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 251 days.

(21) Appl. No.: 17/761,444

(22) PCT Filed: Jul. 31, 2020

(86) PCT No.: PCT/JP2020/029396
§ 371 (c)(1),
(2) Date: Mar. 17, 2022

(87) PCT Pub. No.: WO2021/053974
PCT Pub. Date: Mar. 25, 2021

(65) Prior Publication Data
US 2022/0247328 A1 Aug. 4, 2022

(30) Foreign Application Priority Data
Sep. 20, 2019 (JP) .................................. 2019-172010

(51) Int. Cl.
*H02M 7/53* (2006.01)
*B60L 15/08* (2006.01)
(Continued)

(52) U.S. Cl.
CPC ........... *H02M 7/5395* (2013.01); *B60L 15/08* (2013.01); *H02M 1/12* (2013.01); *H02P 27/08* (2013.01); *H02P 29/40* (2016.02); *B60L 2210/40* (2013.01)

(58) Field of Classification Search
CPC ....... H02M 7/5395; H02M 1/12; H02P 29/40; H02P 27/08
See application file for complete search history.

(56) References Cited

U.S. PATENT DOCUMENTS

2011/0025240 A1 2/2011 Furukawa et al.
2015/0303844 A1* 10/2015 Ajima ..................... H02P 21/14
318/400.13
(Continued)

FOREIGN PATENT DOCUMENTS

JP 2011-35991 A 2/2011
JP 2011-200103 A 10/2011
(Continued)

OTHER PUBLICATIONS

International Search Report (PCT/ISA/210) issued in PCT Application No. PCT/JP2020/029396 dated Nov. 10, 2020 with English translation (four (4) pages).
(Continued)

*Primary Examiner* — Jue Zhang
*Assistant Examiner* — Lakaisha Jackson
(74) *Attorney, Agent, or Firm* — Crowell & Moring LLP

(57) ABSTRACT

An inverter control device 200 includes a current control unit 210 that outputs a voltage commands (Vd*, Vq*), a modulation wave control unit 220 that generates a modulation wave based on the voltage commands (Vd*, Vq*), a pulse generation unit 230 that generates a PWM pulse for controlling an inverter 100 using a modulation wave and a carrier wave of a predetermined frequency, and a pulse shift unit 250 that corrects the phase of the PWM pulse such that the PWM pulse is output in a phase corresponding to a harmonic of a predetermined order of the modulation wave in the near-zero-cross region including the zero-cross point at which the modulation wave changes across 0.

10 Claims, 9 Drawing Sheets

(51) Int. Cl.
  *H02M 1/12*   (2006.01)
  *H02M 7/5395* (2006.01)
  *H02P 27/08*  (2006.01)
  *H02P 29/40*  (2016.01)

(56) References Cited

U.S. PATENT DOCUMENTS

| | | | |
|---|---|---|---|
| 2019/0363646 A1 | 11/2019 | Ajima et al. | |
| 2020/0021217 A1* | 1/2020 | Hano | H02M 1/0009 |
| 2022/0052626 A1* | 2/2022 | Xue | H02M 7/5387 |
| 2022/0286062 A1* | 9/2022 | Tsuruta | H02M 7/5395 |

FOREIGN PATENT DOCUMENTS

| | | |
|---|---|---|
| JP | 2012-165495 A | 8/2012 |
| JP | 2018-133935 A | 8/2018 |

OTHER PUBLICATIONS

Japanese-language Written Opinion (PCT/ISA/237) issued in PCT Application No. PCT/JP2020/029396 dated Nov. 10, 2020 (three (3) pages).

\* cited by examiner

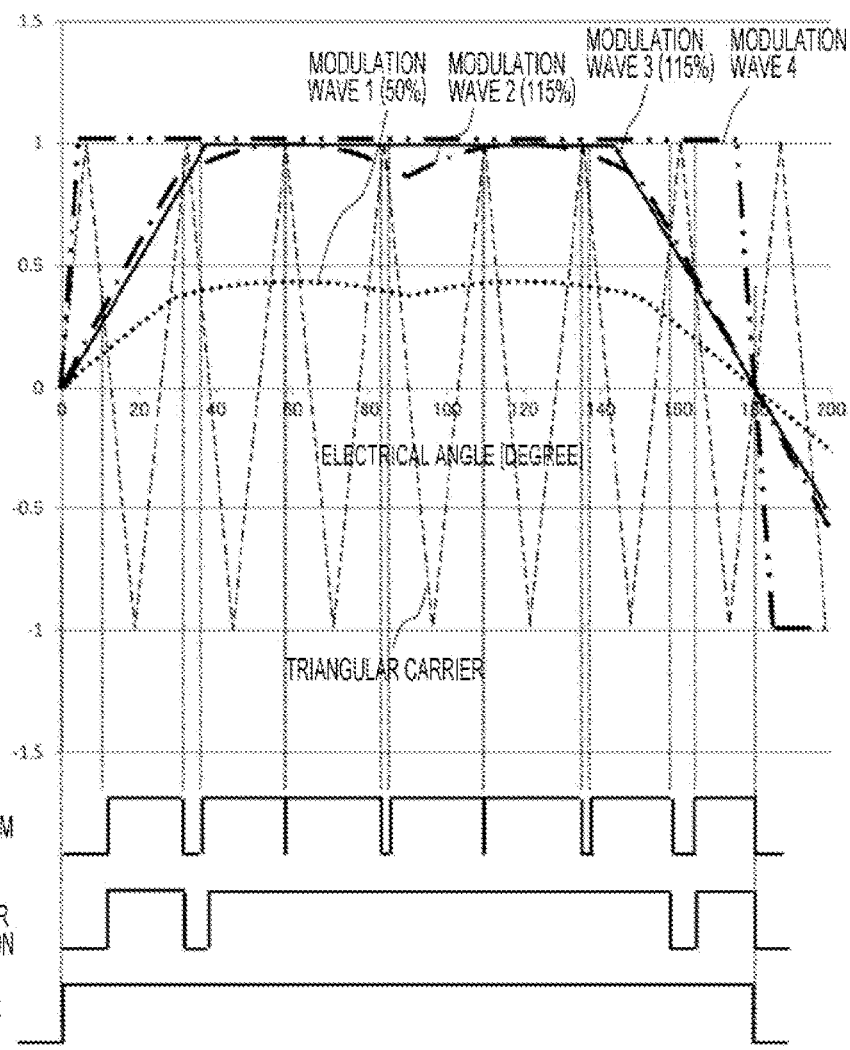
FIG. 2A MODULATION WAVE
FIG. 2B SINE WAVE PWM
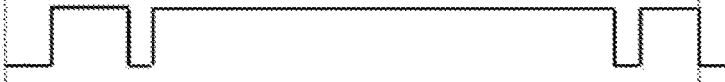
FIG. 2C PWM OF LINEAR APPROXIMATION
FIG. 2D RECTANGULAR WAVE

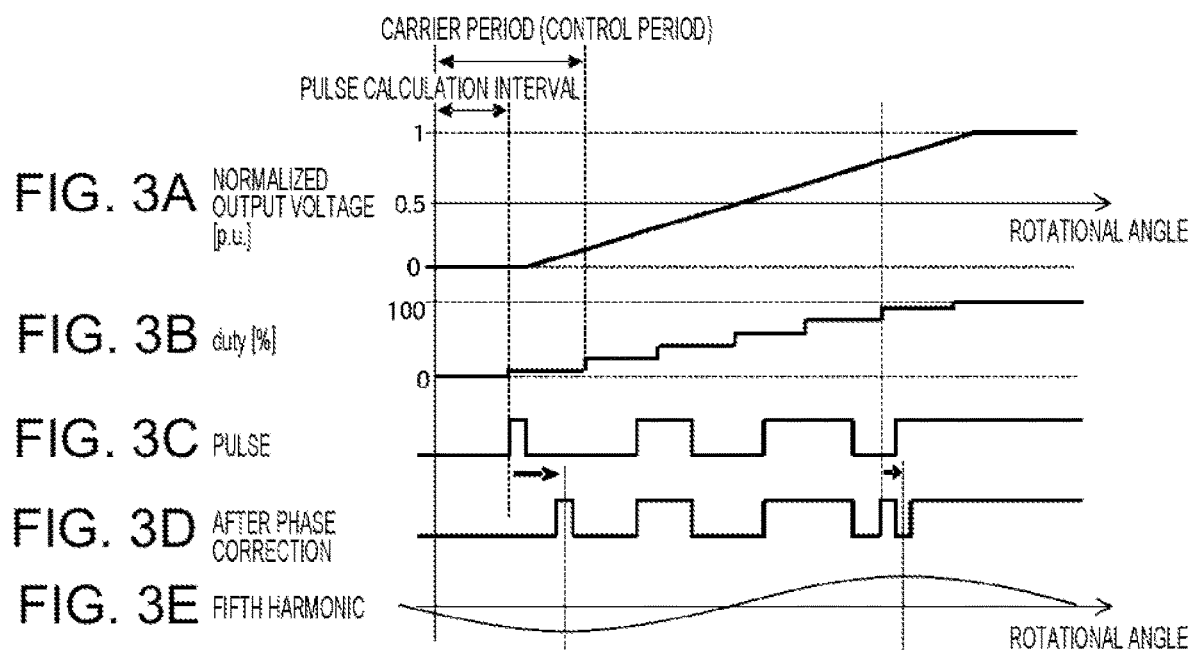

FIG. 4A TRAPEZOIDAL MODULATION WAVE/ CARRIER WAVE 
FIG. 4B PWM PULSE BEFORE PHASE CORRECTION 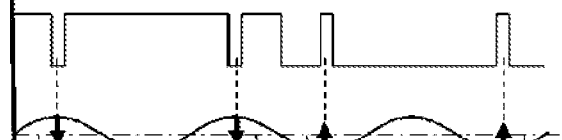
FIG. 4C THIRD HARMONIC 
FIG. 4D PULSE AFTER PHASE CORRECTION 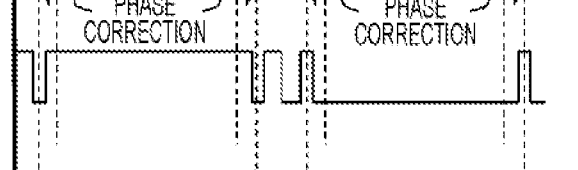
FIG. 4E FIFTH HARMONIC 
FIG. 4F SEVENTH HARMONIC 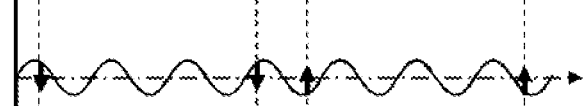

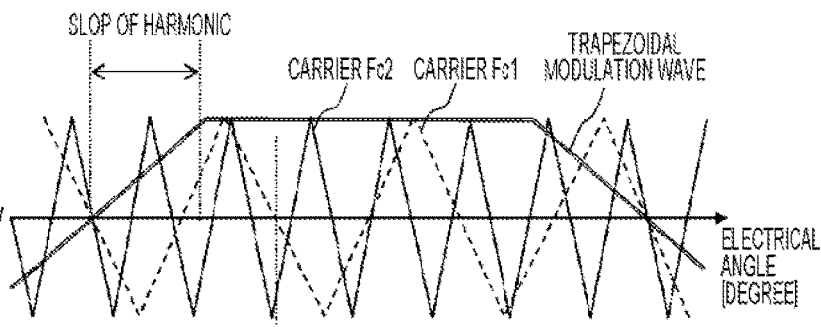
FIG. 6A TRAPEZOIDAL MODULATION WAVE/ CARRIER WAVE
FIG. 6B PWM OF CARRIER Fc1
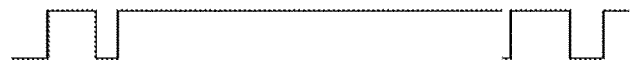
FIG. 6C PWM OF CARRIER Fc2

INVERTER CONTROL DEVICE

TECHNICAL FIELD

The present invention relates to an inverter control device.

BACKGROUND ART

An inverter control device that controls driving of an inverter by pulse width modulation (PWM) control to rotationally drive a motor has been widely used. In such an inverter control device, a technique of operating in an overmodulation mode in which an output voltage command of the inverter exceeds a maximum output level (sine wave) of the inverter in order to increase the rotation speed of the motor is known.

When the inverter control device is operated in the overmodulation mode, harmonics are generated at the output of the inverter and current ripples increase, so that noise and vibration of the motor are generated. Therefore, there is a demand for a technique for suppressing harmonics and reducing current ripples even in the overmodulation mode.

The technique of PTL 1 is known for reducing current ripples in the overmodulation mode. PTL 1 describes an inverter device that changes a pulse width of a PWM pulse at a predetermined timing on an upper side of a trapezoidal wave when trapezoidal wave modulation using a trapezoidal wave is performed in an overmodulation region.

CITATION LIST

Patent Literature

PTL 1: JP 2018-133935 A

SUMMARY OF INVENTION

Technical Problem

In the technique of PTL 1, harmonics cannot be appropriately suppressed in a near-zero-cross region including a zero-cross point at which a trapezoidal wave changes across zero, and there is a possibility that current ripples occur.

Solution to Problem

An inverter control device of the present invention includes a pulse generation unit configured to generate a PWM pulse for controlling an inverter by using a modulation factor based on a voltage command and a pulse period of a predetermined frequency; and a pulse shift unit configured to correct a phase of the PWM pulse such that the PWM pulse is output at a phase corresponding to a harmonic of a predetermined order of a modulation wave in a near-zero-cross region including a zero-cross point where the modulation wave based on the voltage command changes across 0.

Advantageous Effects of Invention

According to the invention, it is possible to suppress current ripples generated in a near-zero-cross region.

BRIEF DESCRIPTION OF DRAWINGS

FIG. 2 is a waveform diagram illustrating a modulation wave in an embodiment.

FIG. 3 is an explanatory diagram of pulse correction in an embodiment.

FIG. 4 is a waveform diagram illustrating pulse generation and pulse correction in an embodiment.

FIG. 6 is a diagram for explaining adjustment of a carrier frequency in an embodiment.

DESCRIPTION OF EMBODIMENTS

The present invention provides an inverter control device that controls an inverter by PWM control, and in performing trapezoidal wave modulation using, for example, a trapezoidal wave obtained by changing a sine wave into a trapezoidal shape as a modulation wave in an overmodulation region having a modulation factor of a predetermined value or more, outputs a PWM pulse in a phase corresponding to a harmonic of a predetermined order, thereby increasing an output of the inverter while reducing current ripple due to the harmonic. Hereinafter, an embodiment of the invention will be described using the drawings.

Figure 1:
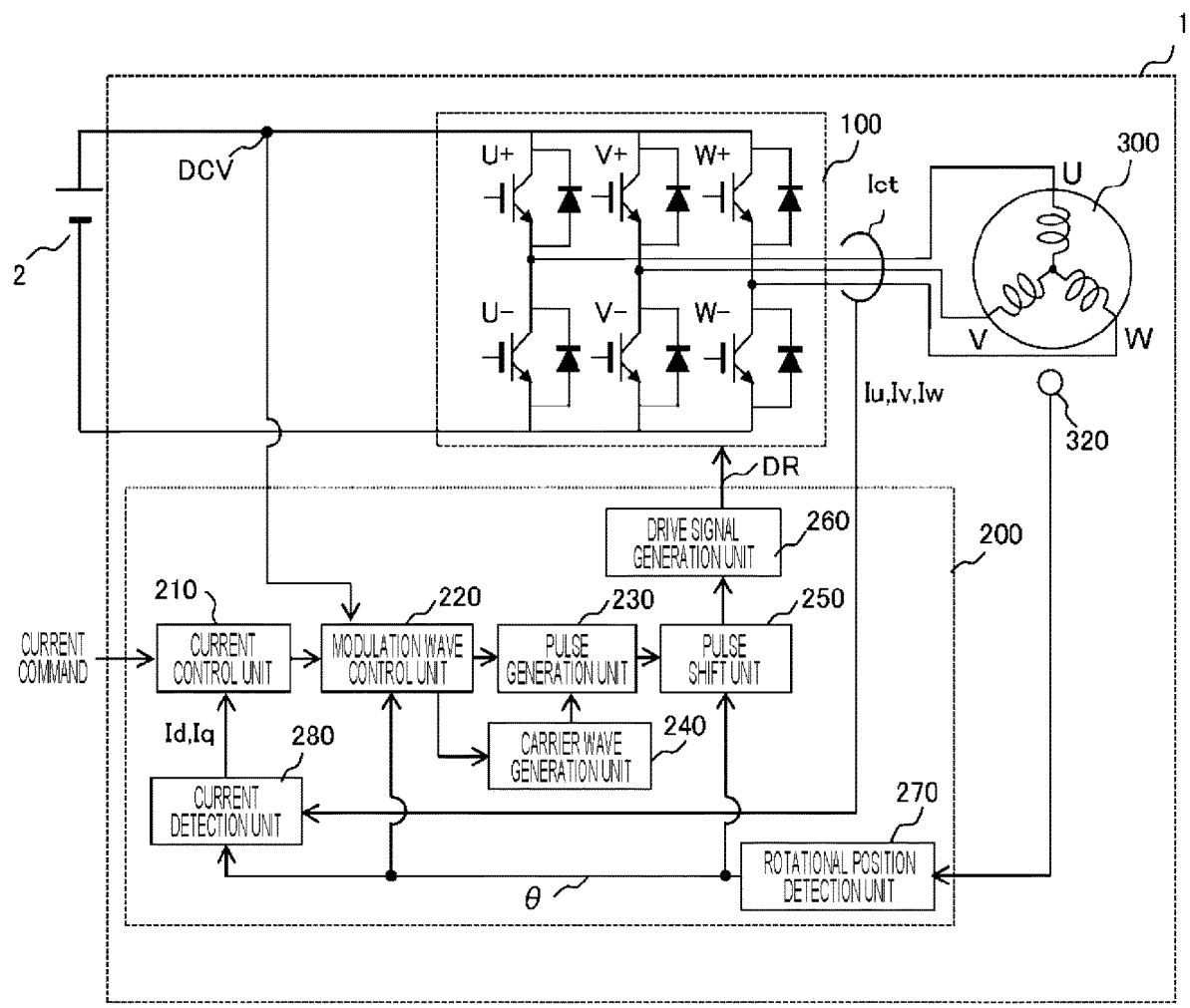
FIG. 1 is a block diagram illustrating a configuration of a motor device including an inverter control device according to an embodiment of the invention.

FIG. 1 is a block diagram illustrating a configuration of a motor device 1 including an inverter control device 200 according to an embodiment of the invention. The motor device 1 is connected to a battery 2, and includes an inverter 100, an inverter control device 200, and a motor 300.

The battery 2 is a DC voltage source of the inverter 100. A DC voltage DCV of the battery 2 is converted into a three-phase AC voltage having a variable voltage and a variable frequency by the inverter 100, and is applied to the motor 300.

The motor 300 is a synchronous motor rotationally driven by supply of a three-phase AC voltage. A rotational position sensor 320 is attached to the motor 300 in order to control the phase of the three-phase AC voltage applied from the inverter 100 to the motor 300 in accordance with the phase of the induced voltage of the motor 300. Here, for example, a resolver including an iron core and a winding can be used as the rotational position sensor 320. Alternatively, the rotational position sensor 320 may be configured using a GMR sensor or a Hall element.

The inverter control device 200 includes a current control unit 210, a modulation wave control unit 220, a pulse generation unit 230, a carrier wave generation unit 240, a pulse shift unit 250, a drive signal generation unit 260, a rotational position detection unit 270, and a current detection unit 280.

The rotational position detection unit 270 detects a rotational position θ of a rotor in the motor 300 based on the output signal of the rotational position sensor 320.

The current detection unit 280 acquires three-phase current detection values (Iu, Iv, Iw) flowing through the motor 300 from a current sensor Ict, and obtains dq-axis current detection values (Id, Iq) by performing three-phase/two-phase conversion on these current detection values on the basis of the rotational position θ detected by the rotational position detection unit 270.

The inverter control device 200 has a current control function for controlling the output of the motor 300. The current control unit 210 outputs voltage commands (Vd*, Vq*) such that the current detection values (Id, Iq) detected by the current detection unit 280 match current command values (Id*, Iq*) input from a host controller (not illustrated).

The modulation wave control unit 220 generates three-phase voltage commands (Vu*, Vv*, Vw*) by performing two-phase/three-phase conversion on the voltage commands (Vd*, Vq*) obtained by the current control unit 210 based on the rotation angle θ. Then, a modulation factor is set based on the three-phase voltage commands (Vu*, Vv*, Vw*) and the DC voltage DCV of the battery 2, and a modulation wave corresponding to the set modulation factor is generated.

The carrier wave generation unit 240 generates a carrier wave having a pulse period of a predetermined frequency. Note that the frequency of the carrier wave generated by the carrier wave generation unit 240 is adjusted according to the modulation factor set by the modulation wave control unit 220 as described later.

The pulse generation unit 230 performs pulse width modulation (PWM) using the modulated wave generated by the modulation wave control unit 220 and the carrier frequency generated by the carrier wave generation unit 240, and generates a PWM pulse for controlling the inverter 100.

The pulse shift unit 250 corrects (shifts) the phase of the PWM pulse generated by the pulse generation unit 230 to adjust the PWM pulse so as to reduce harmonics of the modulation wave in a predetermined order in a near-zero-cross region including a zero-cross point of the modulation wave. The zero-cross point of the modulation wave is a point at which the modulation wave changes across zero. Details of an adjusting method of the PWM pulse by the pulse shift unit 250 will be described later.

The drive signal generation unit 260 converts the PWM pulse phase-corrected by the pulse shift unit 250 into a drive signal DR and outputs the drive signal DR to the inverter 100. The inverter 100 includes a plurality of semiconductor switch elements corresponding to each phase of the three-phase AC voltage, and each semiconductor switch element is controlled to be turned on/off by the drive signal DR. As a result, the output voltage of the inverter 100 is adjusted according to the control of the inverter control device 200.

In the above description, the configuration example of the motor device 1 in a case where the current of the motor 300 is controlled according to the current command from the host controller has been described with reference to FIG. 1, but the configuration of FIG. 1 can be applied even in a case where another control method is adopted. For example, in the case of controlling the rotational speed of the motor 300, a motor rotational speed ωr is calculated by the temporal change of the rotational position θ, and a voltage command or a current command is created so as to coincide with the speed command from the host controller. In the case of controlling the output torque of the motor 300, the current commands (Id*, Iq*) are created using a relational expression or a map of the motor currents (Id, Iq) and the motor torque.

Next, the waveform diagram illustrating a modulation wave in an embodiment of the invention will be described using FIG. 2.

FIG. 2(a) illustrates an example of a modulation signal waveform and a carrier signal waveform. The modulation signal waveform illustrates waveforms of a modulation signal (modulation wave 1) having a relatively low modulation factor, a maximum modulation wave (modulation wave 2) capable of sine wave modulation, a trapezoidal modulation wave (modulation wave 3) obtained by linearly approximating sine wave modulation, and a modulation wave (modulation wave 4) in a rectangular wave state in which an inverter output is maximized. The carrier signal waveform illustrates a waveform of a triangular carrier signal that is compared in magnitude with the modulation wave signal to generate a PWM pulse.

FIG. 2(b) illustrates the PWM pulse signal in the case of the modulation wave 2, and FIG. 2(c) illustrates the PWM pulse signal in the case of the modulation wave 3. In FIG. 2(c), almost 100% of the PWM pulses are continuously turned on in the section of the electrical angle of 30 to 150 degrees. FIG. 2(d) illustrates a PWM pulse signal of the modulation wave 4. The PWM pulse signal is turned on in the entire section of the electrical angle of 0 to 180 degrees.

Each modulation wave is equivalent to the modulation wave H(θ) for one phase of the three-phase voltage commands (Vuc, Vvc, Vwc), and is substantially equal to the U-phase modulation wave Hu (θ)=Vuc/(DCV/2) when the dead time is ignored. Assuming that the effective value of the sine wave when the modulation factor=1 at which the inverter output is not saturated is 1, the fundamental wave component included in the modulation wave H(θ) on which a third harmonic is superimposed is 1.15 times (115%) (modulation wave 2). That is, the inverter output is not saturated until the voltage command at which the modulation factor becomes 1.15.

As illustrated in FIG. 2, the modulation wave H(θ) on which the third harmonic is superimposed can be linearly approximated near the zero cross. In addition, as the modulation factor increases, the modulation wave H(θ) approaches a trapezoidal wave like the modulation wave 3 from a shape like the modulation wave 2. Therefore, in a region where the modulation factor is a predetermined value or more, for example, 1.15 or more, it is possible to generate a PWM pulse by calculation by using a trapezoidal wave such as the modulation wave 3. As a result, the PWM modulation process using a microcomputer or the like can be simplified, and at the same time, it is possible to control the voltage error of the PWM pulse due to the asynchronization between the modulation wave H(G) and the carrier signal.

Note that, considering the modulation wave 2, an angular section of ±30 degrees in terms of electrical angle can be linearly approximated around the zero cross of the modulation wave, but it is preferable to set the angular section to ±35 degrees in terms of electrical angle in consideration of a voltage error near saturation.

In the PWM pulse calculation using the trapezoidal wave modulation, the slope A of the modulation wave in the section where linear approximation can be performed near the zero cross is proportional to the modulation factor according to the voltage command value, and the modulation wave is proportional to the angular position θ.

For example, when the angle near the zero cross is θ' and θ' is −30≤θ'≤30, the modulation wave H(θ') near the zero cross can be expressed by Expression (1).

$$H(\theta')=A\cdot\theta' \qquad (1)$$

That is, since the modulation wave H(θ) near the zero cross can be expressed by using the slope A of the modulation wave instead of the modulation factor, the inverter output pulse near the zero cross, that is, the PWM pulse can be determined from the slope A of the modulation wave.

Under the condition of $|H(\theta)|<|A\cdot\theta|$, the inverter output pulse may be determined as 100% when $0<\theta<180$, and as 0% when $180<\theta<360$.

Next, the pulse correction in an embodiment of the invention will be described using FIG. 3.

FIG. 3(a) illustrates an output voltage waveform obtained by normalizing a part of the modulation wave including the zero cross point. The normalized output voltage varies from 0 to 1.

FIG. 3(b) illustrates the duty of the PWM pulse. As the normalized output voltage increases, the duty of the PWM pulse to be generated at each predetermined pulse calculation interval increases.

FIG. 3(c) illustrates a PWM pulse generated by the pulse generation unit 230 of FIG. 1. The PWM pulse is generated with a pulse width corresponding to the duty of FIG. 3(b) based on the comparison result between the modulation wave and the carrier wave.

FIG. 3(d) illustrates the PWM pulse whose phase has been corrected by the pulse shift unit 250 of FIG. 1, and FIG. 3(e) illustrates the fifth harmonic of the modulation wave. The phase of the PWM pulse closest to the peak of the fifth harmonic in FIG. 3(d) among the PWM pulses in FIG. 3(c) is shifted to the phase corresponding to the peak of the fifth harmonic. As a result, the PWM pulse in a direction opposite to the peak of the fifth harmonic is generated to suppress the fifth harmonic.

Although FIG. 3 illustrates an example in which the phase of the PWM pulse is shifted to the phase corresponding to the peak of the fifth harmonic, the phase of the PWM pulse may be corrected in accordance with the peak of the harmonic of another order such as a seventh harmonic. In addition, the phase of the PWM pulse may be shifted in accordance with phases corresponding to a plurality of orders, for example, both the fifth harmonic and the seventh harmonic. In this way, harmonics of a plurality of orders can be simultaneously suppressed.

Next, the waveform diagram illustrating pulse generation and pulse correction in an embodiment of the invention will be described using FIG. 4.

FIG. 4(a) illustrates a trapezoidal modulation wave (for the U phase), that is, the modulation wave 3 in FIG. 2(a) and a carrier wave having a predetermined frequency. FIG. 4(b) illustrates the PWM pulse (for the U phase) generated by the pulse generation unit 230 of FIG. 1 using the trapezoidal modulation wave and the carrier wave of FIG. 4(a). FIG. 4(c) illustrates the third harmonic (for the U phase) of the trapezoidal modulation wave in FIG. 4(a). FIG. 4(d) illustrates the PWM pulse (for the U phase) after the phase correction in which the phase of the PWM pulse of FIG. 4(b) is corrected by the pulse shift unit 250 of FIG. 1. FIGS. 4(e), 4(f) illustrate the fifth harmonic and the seventh harmonic (for U phase) of the trapezoidal modulation wave in FIG. 4(a).

The PWM pulse before the phase correction in FIG. 4(b) is output in the phase corresponding to the peak of the third harmonic, but is not output in the phase corresponding to the fifth harmonic or the seventh harmonic. Here, since the motor 300 is a three-phase AC motor, the third harmonic is canceled in the entire motor, and current ripple due to the third harmonic does not occur. Therefore, the current ripple generated when the motor 300 is driven using the inverter 100 is greatly affected by the fifth harmonic and the seventh harmonic.

Therefore, in the present embodiment, the pulse shift unit 250 shifts the phase of the PWM pulse generated by the pulse generation unit 230 to the phase corresponding to the peak of the fifth harmonic or the seventh harmonic. As a result, the phase of the PWM pulse changes as illustrated in FIGS. 4(b) to 4(d), and the PWM pulse is output at positions corresponding to both the fifth harmonic and the seventh harmonic, so that both the fifth harmonic and the seventh harmonic can be suppressed without changing the output voltage of the inverter 100, and the current ripple can be reduced.

Specifically, the peak of the fifth harmonic and the peak of the seventh harmonic appear at positions shifted in phase by (180/10) degrees and (180/14) degrees in terms of electrical angle with respect to the zero-cross point. Therefore, the range of a phase shift amount θs corresponding to both the fifth harmonic and the seventh harmonic can be expressed by the following Expression (2).

$$(180+\alpha)/14 \leq \theta s \leq (180+\alpha)/10 \qquad (2)$$

In the present embodiment, the pulse shift unit 250 sets the phase shift amount θs within a range satisfying Expression (2). Then, the phase of the PWM pulse generated by the pulse generation unit 230 is shifted such that the PWM pulse is output in a phase shifted by the set phase shift amount θs from the zero-cross point. As a result, the inverter control device 200 of the present embodiment can output the PWM pulse at the phase corresponding to both the fifth harmonic and the seventh harmonic, and reduce the current ripple. In Expression (2), α can be set to an arbitrary value according to the pulse calculation interval, and is preferably set to, for example, α=(45/2) degrees.

Alternatively, the pulse shift unit 250 may correct the phase of the PWM pulse generated by the pulse generation unit 230 such that the PWM pulse is output in the phase corresponding to the fifth harmonic and the phase corresponding to the seventh harmonic. However, in this case, in order to shift the respective phases by making one of the two PWM pulses correspond to the fifth harmonic and making the other correspond to the seventh harmonic, the pulse generation unit 230 needs to generate at least two PWM pulses near the zero cross.

Figure 5:
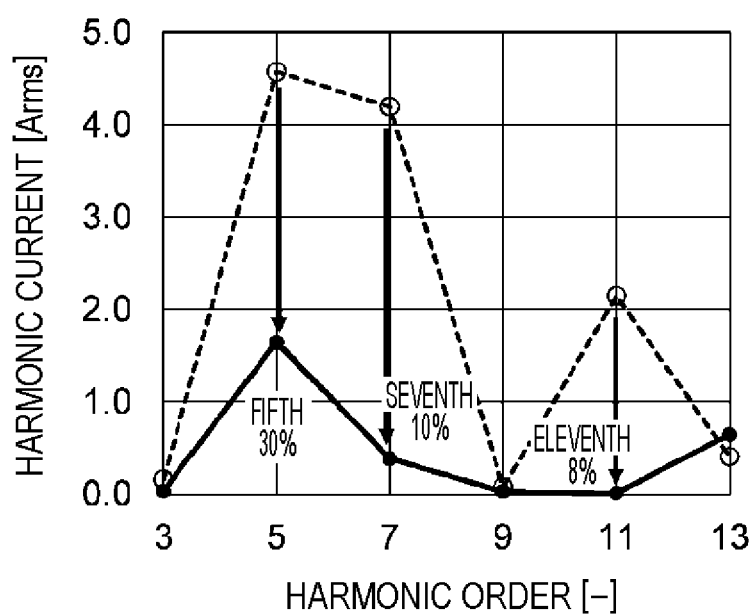
FIG. 5 is a diagram for explaining a harmonic suppression effect by pulse correction in an embodiment.

FIG. 5 is a diagram for explaining a harmonic suppression effect by pulse correction in an embodiment of the invention. In FIG. 5, a broken line indicates a harmonic current for each harmonic order by the PWM pulse before phase correction generated by the pulse generation unit 230, and a solid line indicates a harmonic current for each harmonic order by the PWM pulse after phase correction by the pulse shift unit 250. As illustrated in FIG. 5, by using the PWM pulse after the phase correction, the fifth harmonic current can be reduced to 30%, the seventh harmonic current can be reduced to 10%, and the eleventh harmonic current can be reduced to 8% as compared with the PWM pulse before the phase correction.

Note that, in the present embodiment, in order to suppress overcompensation, when the difference between the phase of the PWM pulse generated by the pulse generation unit 230 and the phase corresponding to the harmonic to be suppressed is a predetermined value or more, it is preferable not to perform the phase correction of the PWM pulse in the pulse shift unit 250. For example, a case where the fifth harmonic and the seventh harmonic are suppressed by correcting the phase such that the PWM pulse is output in the phases corresponding to both the fifth harmonic and the seventh harmonic as described above will be described. In this case, when the difference between the phase of the PWM pulse before the phase correction and the phase corresponding to the peaks of the fifth harmonic and the seventh harmonic is equal to or larger than the predetermined upper limit shift amount θmax, the pulse shift unit 250 does not perform the phase correction of the PWM pulse. The upper limit shift amount θmax at this time can be set according to the width of the peak where the fifth harmonic wave and the seventh harmonic illustrated in FIGS. 4(*e*) and 4(*f*) overlap with each other.

In the above description, an example has been described in which the phases of the PWM pulse are corrected such that the PWM pulse is output in phases corresponding to the fifth harmonic and the seventh harmonic so as to suppress the fifth harmonic and the seventh harmonic. However, harmonics of other orders may be suppressed. For example, the pulse shift unit 250 corrects the phase of the PWM pulse such that the PWM pulse is further output in the phases corresponding to both the eleventh harmonic and the thirteenth harmonic in addition to the phase corresponding to both the fifth harmonic and the seventh harmonic. In this way, in addition to the fifth harmonic and the seventh harmonic, the eleventh harmonic and the thirteenth harmonic can also be suppressed, so that it is possible to further reduce the current ripple.

Next, the adjustment of the carrier frequency in an embodiment of the invention will be described using FIG. 6.

FIG. 6(*a*) illustrates a part of the trapezoidal modulation wave generated by the modulation wave control unit 220 and carrier waves Fc1 and Fc2 generated by the carrier wave generation unit 240, respectively.

FIG. 6(*b*) illustrates the PWM pulse generated using the trapezoidal modulation wave and the carrier wave Fc1 of FIG. 6(*a*). FIG. 6(*c*) illustrates the PWM pulse generated using the trapezoidal modulation wave and the carrier wave Fc2 of FIG. 6(*a*).

When the modulation factor becomes large and the slope section of the trapezoidal modulation wave becomes short, there may be a case where there is no intersection of the modulation wave and the carrier wave in the slope section as in the carrier wave Fc1 of FIG. 6(*a*). In this case, as illustrated in FIG. 6(*b*), the PWM pulse disappears in the slope section, and becomes a rectangular PWM pulse. As a result, the error of the inverter output voltage with respect to the voltage command increases, and the current ripple also increases.

Therefore, in the present embodiment, the carrier wave generation unit 240 adjusts the carrier frequency, that is, the frequency of the pulse period in the carrier wave according to the modulation factor such that an intersection of the modulation wave and the carrier wave occurs in the slope section even at a high modulation factor. Specifically, for example, the carrier wave generation unit 240 generates the carrier wave Fc2 having a higher frequency of the pulse period than the carrier wave Fc1. As a result, as illustrated in FIG. 6(*a*), the slope width of the trapezoidal modulation wave is made larger than the period of the carrier wave Fc2, and an intersection of the trapezoidal modulation wave and the carrier wave Fc2 can be generated in the slope section. Therefore, as illustrated in FIG. 6(*c*), the PWM pulse enters the slope section. As a result, the inverter output voltage can be smoothly controlled to reduce current ripples.

Figure 7:
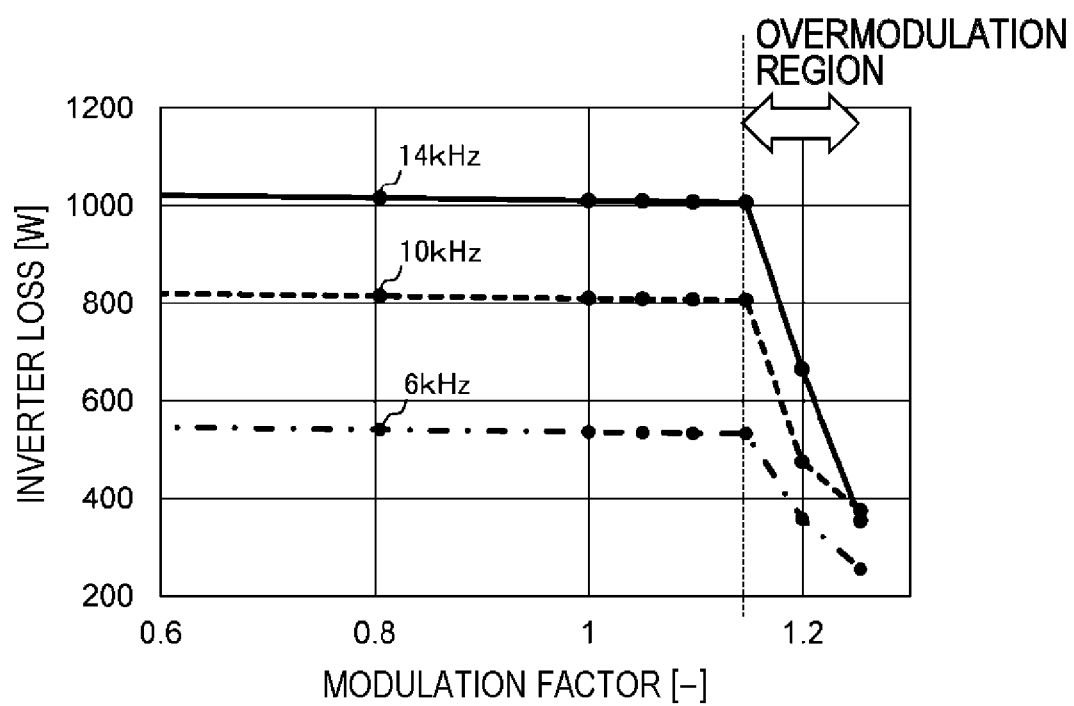
FIG. 7 is a diagram illustrating an example of a relationship between a modulation factor and an inverter loss for each carrier frequency in an embodiment.

FIG. 7 illustrates an example of a relationship between the modulation factor and the inverter loss for each carrier frequency in an embodiment of the invention. FIG. 7 illustrates how much switching loss occurs in the inverter 100 when the modulation factor changes for each case where the carrier frequency is 6 kHz, 10 kHz, and 14 kHz.

As illustrated in FIG. 7, in a normal modulation region where the modulation factor is less than 1.15, the inverter loss for each carrier frequency is substantially constant and does not change even if the modulation factor changes. In addition, since the number of times of switching increases as the carrier frequency increases, the inverter loss increases. On the other hand, in an overmodulation region where the modulation factor is 1.15 or more, that is, in the trapezoidal modulation region, as the modulation factor increases, the modulation wave approaches the rectangular wave from the trapezoidal wave, so that the number of times of switching decreases, and thus the inverter loss decreases. The degree of decrease in the inverter loss at this time increases as the carrier frequency increases. Therefore, as the modulation factor increases, the difference in the inverter loss for each carrier frequency decreases. In other words, in the overmodulation region, the influence of the increase in the carrier frequency on the inverter loss is reduced.

Therefore, in the present embodiment, the frequency of the carrier wave generated by the carrier wave generation unit 240 is increased in the overmodulation region. As a result, the number of PWM pulses in the slope section of the trapezoidal modulation wave can be increased without increasing the inverter loss, and the current ripple can be reduced.

In the above description, the asynchronous PWM is taken as an example, but the PWM control using the trapezoidal modulation wave can be performed by a similar method in the synchronous PWM. In the synchronous PWM, unlike the asynchronous PWM, the relationship between the phase of the modulation wave and the phase of the carrier signal is kept constant, and the period of the modulation wave is set to, for example, an integral multiple of the period of the carrier signal. The same applies to both the synchronous PWM and the asynchronous PWM except for this point.

As described above, in the embodiment of the present invention, regardless of whether the system of the PWM control is the asynchronous PWM or the synchronous PWM, the pulse shift unit 250 corrects the phase of the PWM pulse such that the PWM pulse is output in the phase corresponding to the harmonic of the predetermined order of the modulation wave in the near-zero-cross region including the zero-cross point of the modulation wave. As a result, harmonics of arbitrary orders can be reduced and the current ripples can be reduced without changing the output voltage of the inverter 100.

Next, a configuration of an electric power steering device to which the inverter control device 200 illustrated in an embodiment of the present invention is applied will be described using FIG. 8.

Figure 8:
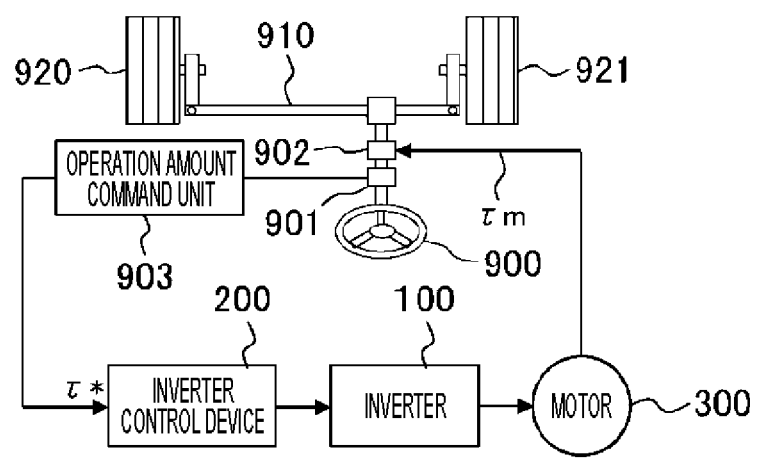
FIG. 8 is a configuration diagram of an electric power steering device to which the inverter control device is applied.

FIG. 8 is a configuration diagram of the electric power steering device to which the inverter control device 200 illustrated in an embodiment of the present invention is applied.

As illustrated in FIG. 8, the electric actuator of the electric power steering includes a torque transmission mechanism 902, the motor 300, the inverter 100, and the inverter control device 200. The electric power steering device includes an electric actuator, a steering wheel (steering) 900, a steering detector 901, and an operation amount command unit 903, and the operation force of the steering wheel 900 steered by a driver is configured to perform torque assist using the electric actuator.

The torque command τ* of the electric actuator is generated by the operation amount command unit 903 as a steering assist torque command of the steering wheel 900. The steering force of the driver is reduced using the output of the electric actuator driven by the torque command τ*. The inverter control device 200 receives the torque command τ* as an input command, and controls the operation of the inverter 100 to control the current flowing through the motor 300 so as to follow a torque command value from a torque constant of the motor 300 and the torque command τ*.

A motor output τm output from the output shaft directly connected to the rotor of the motor 300 transmits torque to a rack 910 of the steering device via the torque transmission mechanism 902 using a speed reduction mechanism such as a worm, a wheel, or a planetary gear, or a hydraulic mechanism. The torque transmitted to the rack 910 reduces (assists) the steering force (operation force) of the steering wheel 900 of the driver by the electric force, and the steering angle of wheels 920 and 921 is operated.

The assist amount is determined as follows. That is, the steering angle and the steering torque are detected by the steering detector 901 incorporated in the steering shaft, and the torque command τ* is calculated by the operation amount command unit 903 in consideration of the state quantity such as the vehicle speed and the road surface condition.

The inverter control device 200 according to an embodiment of the invention has an advantage that vibration and noise can be reduced by averaging the output voltage of the inverter 100 even when the motor 300 rotates at a high speed.

Figure 9:
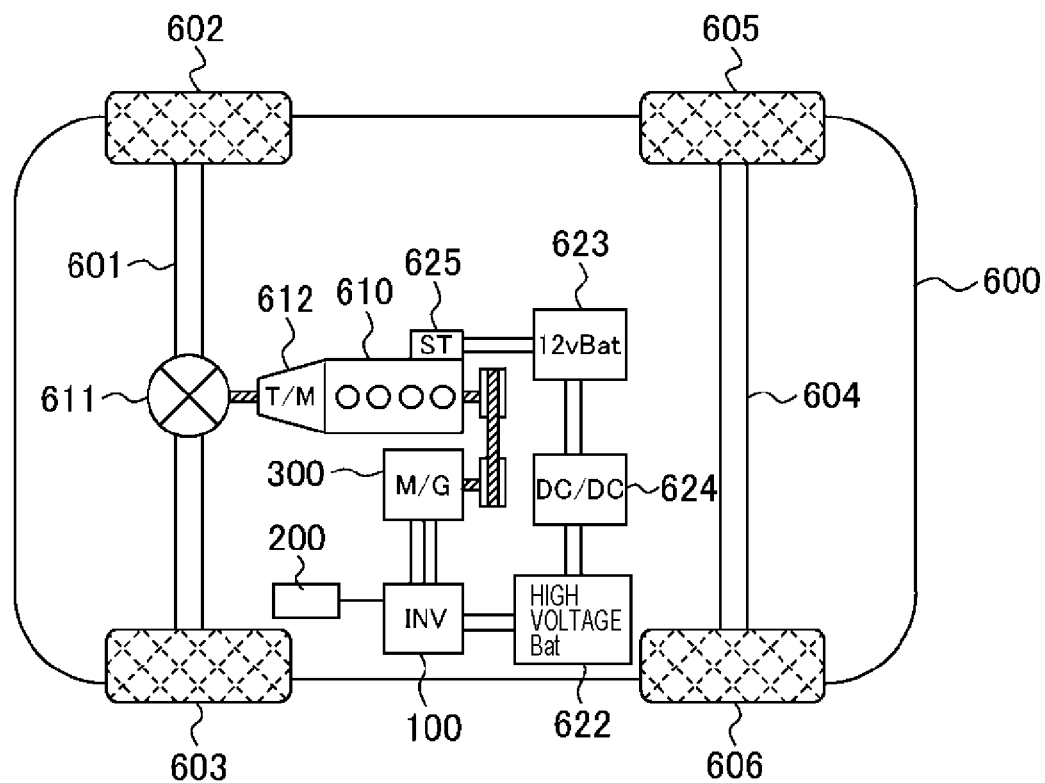
FIG. 9 is a configuration diagram of an electric vehicle to which the inverter control device is applied.

FIG. 9 is a diagram illustrating an electric vehicle 600 to which the inverter control device 200 according to the invention is applied. The electric vehicle 600 has a power train in which the motor 300 is applied as a motor/generator.

A front wheel axle 601 is rotatably supported on a front portion of the electric vehicle 600, and front wheels 602 and 603 are provided at both ends of the front wheel axle 601. A rear wheel axle 604 is rotatably supported on a rear portion of the electric vehicle 600, and rear wheels 605 and 606 are provided at both ends of the rear wheel axle 604.

A differential gear 611 which is a power distribution mechanism is provided at a central portion of the front wheel axle 601, and a rotational driving force transmitted from an engine 610 via a transmission 612 is distributed to the left and right front wheel axles 601. The engine 610 and the motor 300 are mechanically connected via a belt stretched between pulleys provided on a crank shaft of the engine 610 and provided on the rotation shaft of the motor 300.

As a result, the rotational driving force of the motor 300 can be transmitted to the engine 610, and the rotational driving force of the engine 610 can be transmitted to the motor 300. In the motor 300, the three-phase AC power output from the inverter 100 according to the control of the inverter control device 200 is supplied to the stator coil of the stator, so that the rotor rotates and generates a rotational driving force according to the three-phase AC power.

That is, while the motor 300 is controlled by the inverter control device 200 to operate as an electric motor, the motor operates as a generator that generates three-phase AC power when the rotor rotates by receiving the rotational driving force of the engine 610.

The inverter 100 is a power conversion device that converts DC power supplied from a high-voltage battery 622, which is a high-voltage (42 V or 300 V) system power supply, into three-phase AC power, and controls the three-phase AC current flowing through the stator coil of the motor 300 on the basis of the operation command value and the magnetic pole position of the rotor.

The three-phase AC power generated by the motor 300 is converted into DC power by the inverter 100 to charge the high-voltage battery 622. The high-voltage battery 622 is electrically connected to a low-voltage battery 623 via a DC-DC converter 624. The low-voltage battery 623 constitutes a low voltage (14 v) system power supply of the electric vehicle 600, and is used as a power supply for a starter 625 for initially starting (cold starting) the engine 610, a radio, a light, and the like.

When the electric vehicle 600 is at a stop such as waiting for a traffic light (idle stop mode), the engine 610 is stopped, and when the engine 610 is restarted (hot start) at the time of re-departure, the motor 300 is driven by the inverter 100 to restart the engine 610.

In the idle stop mode, when the amount of charge of the high-voltage battery 622 is insufficient or when the engine 610 is not sufficiently warmed, the engine 610 continues to be driven without stopping. Further, during the idle stop mode, it is necessary to secure a drive source of auxiliary machines using the engine 610 as a drive source, such as a compressor of an air conditioner. In this case, the motor 300 is driven to drive the auxiliary machines.

Even in an acceleration mode or a high load operation mode, the motor 300 is driven to assist the driving of the engine 610. On the other hand, when the high-voltage battery 622 is in a charging mode requiring charging, the engine 610 causes the motor 300 to generate power to charge the high-voltage battery 622. That is, the motor 300 performs regenerative operation at the time of braking, deceleration, or the like of the electric vehicle 600.

The electric vehicle 600 includes the inverter control device 200 that generates a PWM pulse for converting a DC voltage into an AC voltage on the basis of a motor output request, the inverter 100 that converts a DC voltage into an AC voltage by the generated PWM pulse and drives the motor 300, and the DC/DC converter 624 that boosts a DC voltage. When performing trapezoidal wave modulation using a trapezoidal wave in the overmodulation region by the processing of the pulse shift unit 250 as described above, the inverter control device 200 adjusts the PWM pulse so as to reduce harmonics of a modulation wave of a predetermined order in the near-zero-cross region including the zero-cross point of the modulation wave. As a result, it is possible to stably perform control of reducing the current ripples generated in the near-zero-cross region and expanding the output range of the inverter 100 by adjusting the output voltage of the DC/DC converter 624 of the electric vehicle 600.

The inverter control device according to the present invention described above has the following effects.

(1) The inverter control device 200 of the present invention includes the pulse generation unit 230 configured to generate a PWM pulse for controlling the inverter 100 by using a modulation factor based on a voltage command and a pulse period of a predetermined frequency; and the pulse shift unit 250 configured to correct a phase of the PWM pulse such that the PWM pulse is output in a phase corresponding to a harmonic of a predetermined order of a modulation wave in a near-zero-cross region including a zero-cross point at which the modulation wave based on the voltage command changes across 0. With this configuration, it is possible to reduce current ripples generated in the near-zero-cross region. As a result, the motor can be stably controlled up to high-speed rotation.

(2) In the inverter control device 200 of the present invention, the pulse shift unit 250 preferably does not correct the phase of the PWM pulse when a difference between the phase of the PWM pulse generated by the pulse generation unit 230 and a phase corresponding to the harmonic is equal to or larger than a predetermined upper limit shift amount θmax. In this way, overcompensation can be suppressed, and an error of the inverter output voltage with respect to the voltage command can be reduced.

(3) In the inverter control device 200 of the present invention, the upper limit shift amount θmax is set according to a width of a peak where a fifth harmonic and a seventh harmonic of the modulation wave overlap. Thus, the upper limit shift amount θmax can be appropriately set.

(4) In the inverter control device 200 of the present invention, the pulse shift unit 250 can correct the phase of the PWM pulse such that the PWM pulse is output at phases corresponding to both the fifth harmonic and the seventh harmonic of the modulation wave. In this way, the fifth harmonic and the seventh harmonic having a large influence on the current ripple can be effectively suppressed.

(5) In the inverter control device 200 of the present invention, the pulse generation unit 230 can generate two or more PWM pulses in the near-zero-cross region. In this case, the pulse shift unit 250 can correct the phase of the PWM pulse such that the PWM pulse is output at phases corresponding to both the fifth harmonic and the seventh harmonic of the modulation wave and at phases corresponding to both an eleventh harmonic and a thirteenth harmonic of the modulation wave. In this way, in addition to the fifth harmonic and the seventh harmonic, the eleventh harmonic and the thirteenth harmonic can also be suppressed, so that it is possible to further reduce the current ripple.

(6) In the inverter control device 200 of the present invention, the pulse generation unit 230 can generate two or more PWM pulses in the near-zero-cross region. In this case, the pulse shift 250 unit can also correct the phase of the PWM pulse such that the PWM pulse is output at a phase corresponding to the fifth harmonic of the modulation wave and at a phase corresponding to the seventh harmonic of the modulation wave. In this way, the fifth harmonic and the seventh harmonic having a large influence on the current ripple can be more effectively suppressed, so that the current ripple can be further reduced.

(7) In the inverter control device 200 of the present invention, the pulse shift unit 250 corrects the phase of the PWM pulse in an overmodulation region where the modulation wave is a trapezoidal wave. With this configuration, the current ripple can be effectively reduced in the overmodulation region where the harmonic is generated and the current ripple increases.

(8) The inverter control device 200 of the present invention further includes the carrier wave generation unit 240 configured to generate a carrier wave having the pulse period of the predetermined frequency. The carrier wave generation unit 240 increases a frequency of the carrier wave in the overmodulation region. Specifically, the frequency of the carrier wave is adjusted such that the slope width of the trapezoidal wave is larger than the period of the carrier wave. With this configuration, in the overmodulation region where the error of the inverter output voltage with respect to the voltage command increases and the current ripple increases, the inverter output voltage can be smoothly controlled and the current ripple can be reduced.

(9) In the inverter control device 200 of the present invention, the pulse shift unit 250 corrects the phase of the PWM pulse such that the PWM pulse is output at a phase shifted from the zero-cross point by a predetermined phase shift amount θs. The phase shift amount θs at this time is a value of $((180-\alpha)/14)$ degrees or more and $((180+\alpha)/10)$ degrees or less in terms of electrical angle. With this configuration, the PWM pulse can be output in accordance with the peak of the fifth harmonic and the peak of the seventh harmonic. As a result, the fifth harmonic and the seventh harmonic having a large influence on the current ripple can be effectively suppressed, and the current ripple can be reduced.

Although the case where the electric vehicle 600 of one embodiment is a hybrid car has been described, a similar effect can be obtained in the case of a plug-in hybrid car, an electric car, or the like.

Further, in the above-described embodiment, the inverter control device alone has been described, but the present invention can also be applied to an inverter device in which the inverter control device and the inverter are integrated or a motor drive system in which the inverter device and the motor are integrated as long as the above-described functions are included.

Further, the invention is not limited to the above-described embodiments, and can be changed within a scope not departing from the spirit of the invention.

REFERENCE SIGNS LIST

1 motor device
2 battery
100 inverter
200 inverter control device
210 current control unit
220 modulation wave control unit
230 pulse generation unit
240 carrier wave generation unit
250 pulse shift unit
260 drive signal generation unit
270 rotational position detection unit
280 current detection unit
300 motor
320 rotational position sensor
600 electric vehicle

The invention claimed is:

1. An inverter control device, comprising:
a pulse generation unit configured to generate a pulse width modulation (PWM) pulse for controlling an inverter by using a modulation factor based on a voltage command and a pulse period of a predetermined frequency; and
a pulse shift unit configured to correct a phase of the PWM pulse such that the PWM pulse is output at a phase corresponding to a harmonic of a predetermined order of a modulation wave in a near-zero-cross region including a zero-cross point where the modulation wave based on the voltage command changes across 0.

2. The inverter control device according to claim 1, wherein the pulse shift unit does not correct the phase of the PWM pulse when a difference between the phase of the PWM pulse generated by the pulse generation unit and a phase corresponding to the harmonic is equal to or larger than a predetermined value.

3. The inverter control device according to claim 2, wherein the predetermined value is set according to a width of a peak where a fifth harmonic and a seventh harmonic of the modulation wave overlap with each other.

4. The inverter control device according to claim 1, wherein the pulse shift unit corrects the phase of the PWM pulse such that the PWM pulse is output at phases corresponding to both the fifth harmonic and the seventh harmonic of the modulation wave.

5. The inverter control device according to claim 4, wherein
the pulse generation unit generates two or more PWM pulses in the near-zero-cross region, and the pulse shift unit corrects the phase of the PWM pulse such that the PWM pulse is output at phases corresponding to both the fifth harmonic and the seventh harmonic of the modulation wave and at phases corresponding to both an eleventh harmonic and a thirteenth harmonic of the modulation wave.

6. The inverter control device according to claim 1, wherein
the pulse generation unit generates two or more PWM pulses in the near-zero-cross region, and
the pulse shift unit corrects the phase of the PWM pulse such that the PWM pulse is output at a phase corresponding to the fifth harmonic of the modulation wave and at a phase corresponding to the seventh harmonic of the modulation wave.

7. The inverter control device according to claim 1, wherein the pulse shift unit corrects the phase of the PWM pulse in an overmodulation region where the modulation wave is a trapezoidal wave.

8. The inverter control device according to claim 7, further comprising:
a carrier wave generation unit configured to generate a carrier wave having the pulse period, wherein
the carrier wave generation unit increases a frequency of the carrier wave in the overmodulation region.

9. The inverter control device according to claim 8, wherein the carrier wave generation unit adjusts the frequency of the carrier wave such that a slope width of the trapezoidal wave becomes larger than a period of the carrier wave.

10. The inverter control device according to claim 1, wherein
the pulse shift unit corrects the phase of the PWM pulse such that the PWM pulse is output at a phase shifted from the zero-cross point by a predetermined phase shift amount, and
the phase shift amount is a value of $((180-\alpha)/14)$ degrees or more and $((180+\alpha)/10)$ degrees or less in terms of electrical angle.

* * * * *